United States Patent
Yoon et al.

(10) Patent No.: US 7,412,133 B2
(45) Date of Patent: Aug. 12, 2008

(54) WAVELENGTH SELECTIVE OPTICAL FOCUSING DEVICE USING OPTICAL FIBER AND OPTICAL MODULE USING THE SAME

(75) Inventors: Shin Young Yoon, Kwangju (KR); Sei Hyoung Lee, Kwangju (KR); Hyun Seo Kang, Kwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/319,688

(22) Filed: Dec. 28, 2005

(65) Prior Publication Data

US 2007/0071389 A1 Mar. 29, 2007

(30) Foreign Application Priority Data

Sep. 28, 2005 (KR) ............... 10-2005-0090752
Oct. 18, 2005 (KR) ............... 10-2005-0098327

(51) Int. Cl.
*G02B 6/34* (2006.01)
*G02B 6/26* (2006.01)
*G02B 6/42* (2006.01)

(52) U.S. Cl. ................ 385/37; 385/31; 385/39; 385/123

(58) Field of Classification Search ............ 385/37
See application file for complete search history.

(56) References Cited

U.S. PATENT DOCUMENTS 5,042,897 A    8/1991  Meltz et al.
5,164,956 A *  11/1992 Lang ........................ 372/96
6,292,282 B1 *  9/2001 Mossberg et al. ......... 398/99
6,628,850 B1 *  9/2003 Yao .......................... 385/10
6,801,550 B1   10/2004 Snell et al.
7,006,733 B2 *  2/2006 Galstian et al. ........... 385/37
2004/0165637 A1 *  8/2004 Bullington et al. ....... 372/50
2005/0008294 A1 *  1/2005 Park et al. ................. 385/37
2005/0141808 A1 *  6/2005 Cheben et al. ............ 385/31

FOREIGN PATENT DOCUMENTS

| JP | 11344620      | 12/1999 |
| JP | 2000329627    | 11/2000 |
| KR | 10-2005 0008280 | 1/2005 |
| KR | 1020050075800 | 7/2005 |

OTHER PUBLICATIONS

Wonsuk Lee et al, "An Efficient Framework for Composite Enabled Mobile Web Services," The 7th International Conference on Advanced Communication Technology, IEEE/ICACT2005.

* cited by examiner

*Primary Examiner*—Frank G. Font
*Assistant Examiner*—Ryan Lepisto
(74) *Attorney, Agent, or Firm*—Ladas & Parry LLP

(57) ABSTRACT

The present invention provides a wavelength selective optical focusing device using the cladding-etching of an optical fiber and an optical module using the same. The wavelength selective optical focusing device includes a core for transmitting an optical signal therethrough; and a cladding layer surrounding the core and having a plurality of grooves formed in the outer circumferential surface thereof such that the grooves are changed at a designated rate, wherein an optical signal having a designated wavelength guided by the core is focused to the outside of the cladding layer by the grooves.

20 Claims, 7 Drawing Sheets

(a)

(b)

(a)

(b)

(a)

(b)

(a)

(b)

WAVELENGTH SELECTIVE OPTICAL FOCUSING DEVICE USING OPTICAL FIBER AND OPTICAL MODULE USING THE SAME

BACKGROUND OF THE INVENTION

1. Field of the Invention

The present invention relates to an optical focusing device, and more particularly to a wavelength selective optical focusing device using the cladding-etching of an optical fiber and an optical module using the same.

2. Description of the Related Art

In order to detect an optical signal traveling through a core of an optical fiber, a path of a core mode of the optical signal transmitted through the core must be changed. However, since the core of the optical fiber is generally coated with a cladding layer having a relative large thickness, the core mode is rarely affected by external factors. For this reason, in order to detect the optical signal from the optical fiber, the optical fiber must be physically deformed. The physical deformation of the optical fiber so that the optical signal is detected from the optical fiber is performed by various methods. One method, which is most easily performed using characteristics of the optical fiber, is the generation of a fiber Bragg grating (FBG) in the core of the optical fiber.

For example, U. S. Pat. No. 5,042,897 entitled "Optical waveguide embedded light redirecting Bragg grating arrangement" discloses an optical fiber, which detects an in-line optical signal using a fiber Bragg grating, as shown in FIG. 1. With reference to FIG. 1, a slanted fiber Bragg grating 11 (having the grating slits spaced at a distance a) is formed in a core 12 so as to radiate a waveguide signal (Rλ) to the outside of the core 12 at an angle α. The above structure is advantageous in that an optical signal traveling through the core 12 is simply radiated to the outside of the optical fiber 10 without an additional device. However, the above structure has a low efficiency in radiating an optical signal to the outside of the core 12, and can be used to monitor an optical signal but is not adequate to detect an optical signal having a high coupling factor. Further, in order to refocus light radiated to the outside of the optical fiber 10, an additional device, such as a lens, is required.

Further, Korean Patent Laid-open Publication No. 2005-8280 entitled "Optical waveguide grating lens and method for manufacturing the same" discloses a focusing waveguide grating coupler (FWGC) for improving a coupling efficiency, as shown in FIG. 2. With reference to FIG. 2, a FWGC 20 comprises a planar waveguide having a substrate cladding layer 21 and a core 22, an upper cladding layer 23 formed on the planar waveguide, a slanted fiber Bragg grating (FBG) 28 formed in the core 22, and a Fresnel grating lens 24 formed on the upper cladding layer 23. In the above structure, a core mode 27 travels along the planar waveguide, and is diffracted by the slanted FBG 28, thereby generating a slanted output beam 25. Then, the slanted output beam 25 is diffracted by the Fresnel grating lens 24, thereby being concentrated onto a focus 26. The above planar waveguide is disadvantageous in that its manufacturing process is complicated and the mode matching with the optical fiber must be correctly achieved so as to minimize loss in transmitting the optical signal. Further, as shown in FIG. 2, slanted FBG 28 of the FWGC 20 is formed in the core 22 by changing a refractive index by causing ultraviolet rays to be incident onto a material sensitive to ultraviolet rays (UV) through a phase mask. However, the above FBG 28 formed using ultraviolet rays (UV) is disadvantageous in that its reproducibility in manufacturing is reduced, aging effects, such as changes in refractive index, are severely generated, and it is difficult to have the maximum optical coupling efficiency above 50%.

SUMMARY OF THE INVENTION

The present invention provides a wavelength selective optical focusing device using an optical fiber, which has excellent reproducibility in manufacturing and prevents aging, and an optical module using the same.

In accordance with one aspect of the present invention, the above and other objects can be accomplished by the provision of a wavelength selective optical focusing device using an optical fiber comprising: a core for transmitting an optical signal therethrough; and a cladding layer surrounding the core and having a plurality of grooves formed in the outer circumferential surface thereof such that the grooves are changed at a designated rate, wherein an optical signal having a designated wavelength guided by the core is focused to the outside of the cladding layer by the grooves.

In accordance with another aspect of the present invention, there is provided an optical module comprising: a sub-mount; an optical focusing device mounted on the sub-mount, comprising a core for transmitting an optical signal therethrough and a cladding layer surrounding the core and having a plurality of grooves formed in the outer circumferential surface thereof such that the grooves are changed at a designated rate, wherein an optical signal having a designated wavelength guided by the core is focused to the outside of the cladding layer by the grooves; and an optical element arranged on the sub-mount at a position, onto which the optical signal is focused by the optical focusing device, for receiving or transmitting the optical signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
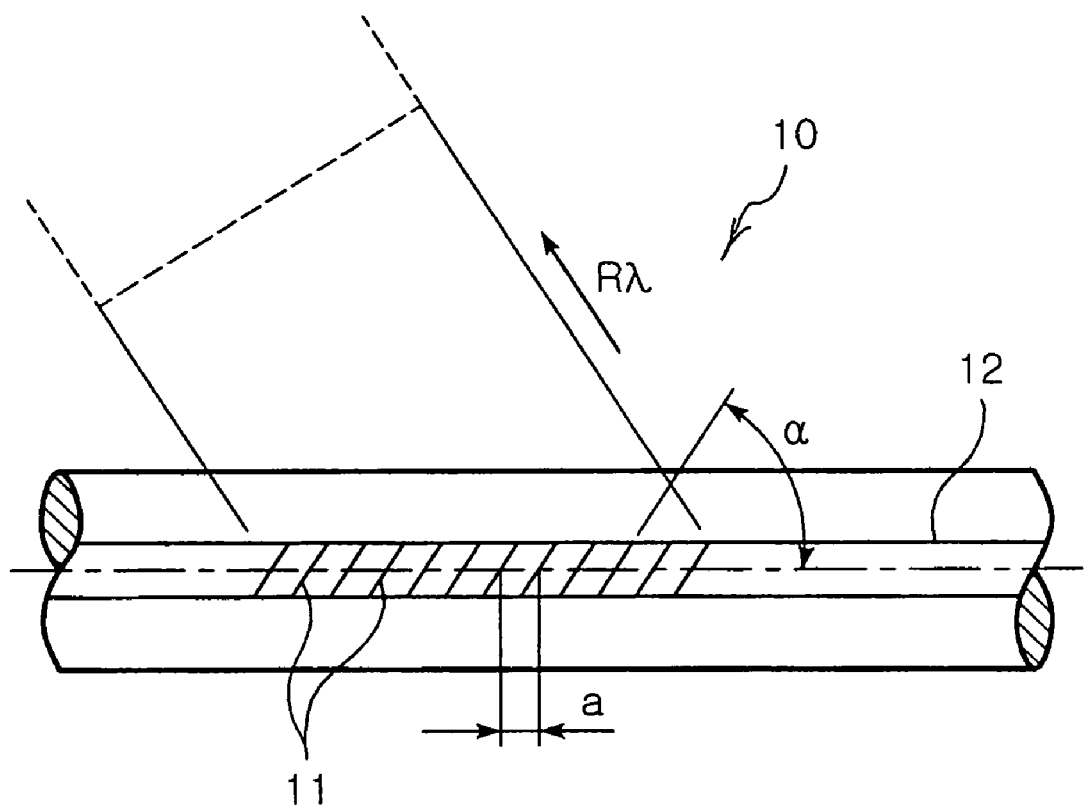
FIG. 1 is a schematic view of a conventional optical fiber, which detects an in-line optical signal using a fiber Bragg grating.
Figure 2:
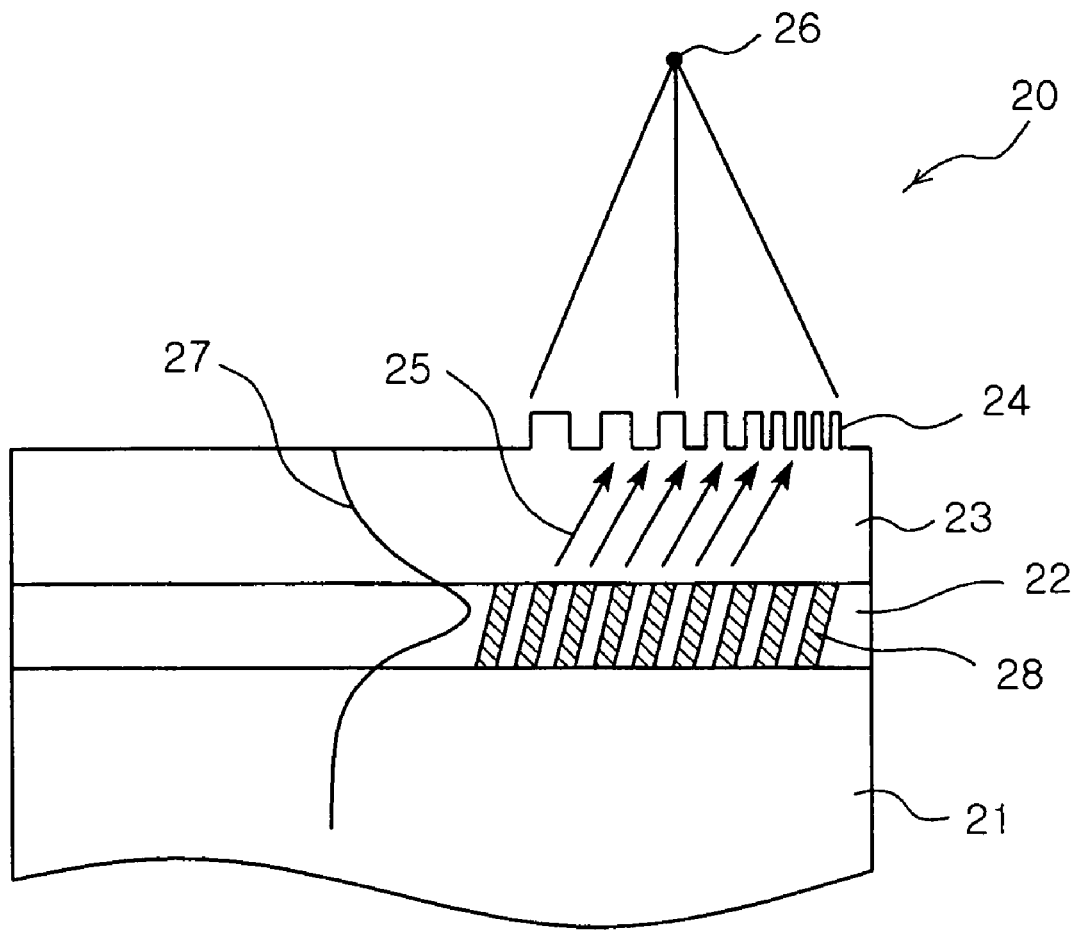
FIG. 2 is a schematic view of a conventional focusing waveguide grating coupler.

Now, preferred embodiments of the present invention will be described in detail with reference to the annexed drawings. In the drawings, the same or similar elements are denoted by the same reference numerals even though they are depicted in different drawings. In the following description of the present invention, a detailed description of known functions and configurations incorporated herein will be omitted when it may make the subject matter of the present invention rather unclear.

FIGS. 3A and 3B illustrate a wavelength selective optical focusing device using an optical fiber of the present invention.

FIG. 3A is a perspective view of the wavelength selective optical focusing device 40 using the optical fiber of the present invention, and FIG. 3B is a sectional view of the wavelength selective optical focusing device 40.

The wavelength selective optical focusing device 40 of the present invention comprises a core 42, along which an optical signal 41 is transmitted, and a cladding layer 44, in which a fiber grating 43 having a plurality of grooves is formed.

That is, the wavelength selective optical focusing device 40 is manufactured using an optical fiber having the core 42, along which the optical signal 41 is transmitted, and the cladding layer 44, in which the fiber grating 43 having a plurality of grooves is formed.

The optical signal 41 having designated data is guided by the core 42. The optical signal 41, which is guided by the core 42, is referred to as a "core mode", which has a parabolic mode pattern 45, as shown in FIG. 1.

The fiber grating 43 having a plurality of grooves changed at a designated rate is formed in the outer surface of the cladding layer 44 by partial-etching. In the present invention, the fiber grating 43 has micro grooves formed in the outer surface of the cladding layer 44 by drying or wet etching using photolithography (PR).

The grooves of the fiber grating 43 are formed such that the intervals of the grooves are gradually increased or decreased in the traveling direction of the optical signal 41 in the longitudinal direction of the optical fiber. As shown in FIGS. 3A and 3B, the grooves of the fiber grating 43 are formed such that the intervals of the grooves are gradually increased in the traveling direction of the optical signal 41. Further, as shown in FIG. 4, the grooves of the fiber grating 43 may be formed such that the intervals of the grooves are gradually decreased in the traveling direction of the optical signal 41. An array of the grooves, the intervals between which are gradually increased or decreased at a designated rate, is referred to as a "chirp", and the above fiber grating having the grooves, the intervals between which are gradually increased or decreased at a designated rate, is referred to as a "chirp grating". The grooves may be formed by peeling a coating layer off from the optical fiber and then forming a pattern in the cladding layer 44 by finely etching the outer circumferential surface of the cladding layer 44.

The widths (w) of the etching pattern, i.e., the grooves, are varied according to the wavelength ($\lambda_o$) of the used optical signal 41. When the optical signal 41 having a wavelength of 1,550 nm is used, the grooves having a width of less than 1 μm are formed. Preferably, the grooves have a depth (d) such that the grooves are extended to a distance (I) or (l) in FIG. 3 closest to the core 42, where the core mode 45 transmitted by the core 42 can affect the cladding layer 44. That is, the grooves are formed at the outside of the core 42 in the crosswise direction of the optical fiber.

The grooves are filled with a polymer or an index matching material having the same or a different refractive index as or from that of the cladding layer 44.

Figure 3:
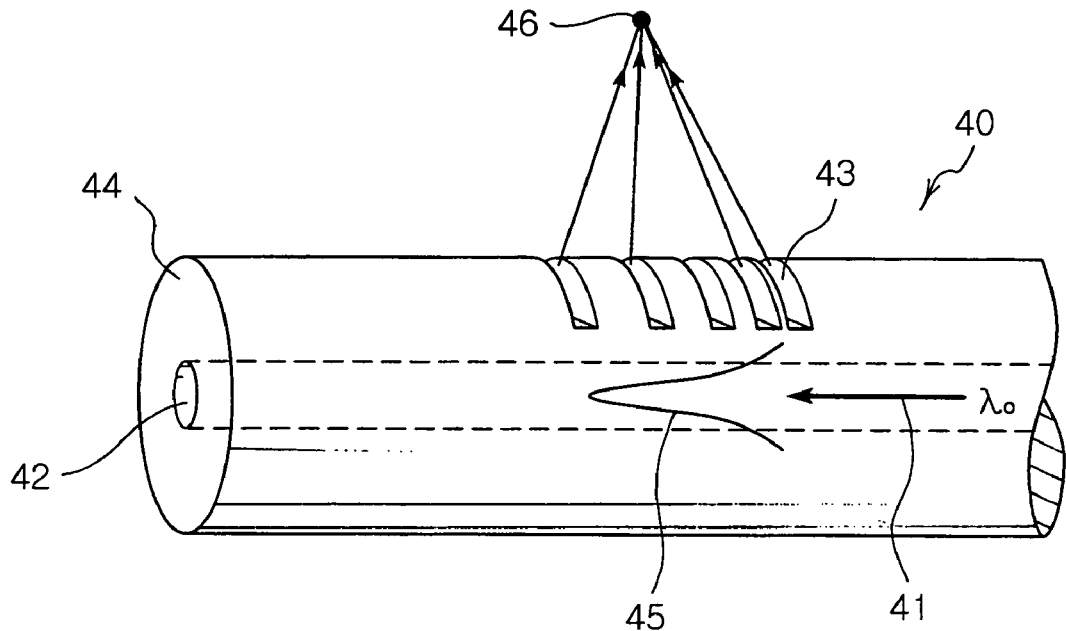
FIGS. 3A and 3B are perspective and sectional views of a wavelength selective optical focusing device using an optical fiber of the present invention.
Figure 3:
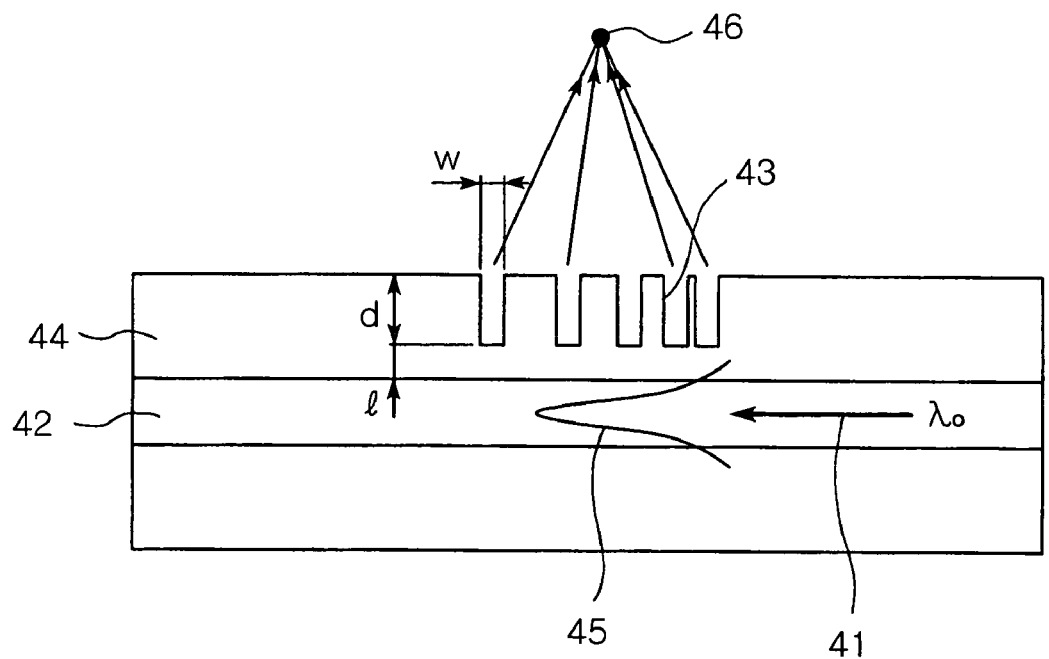
Figure 4:
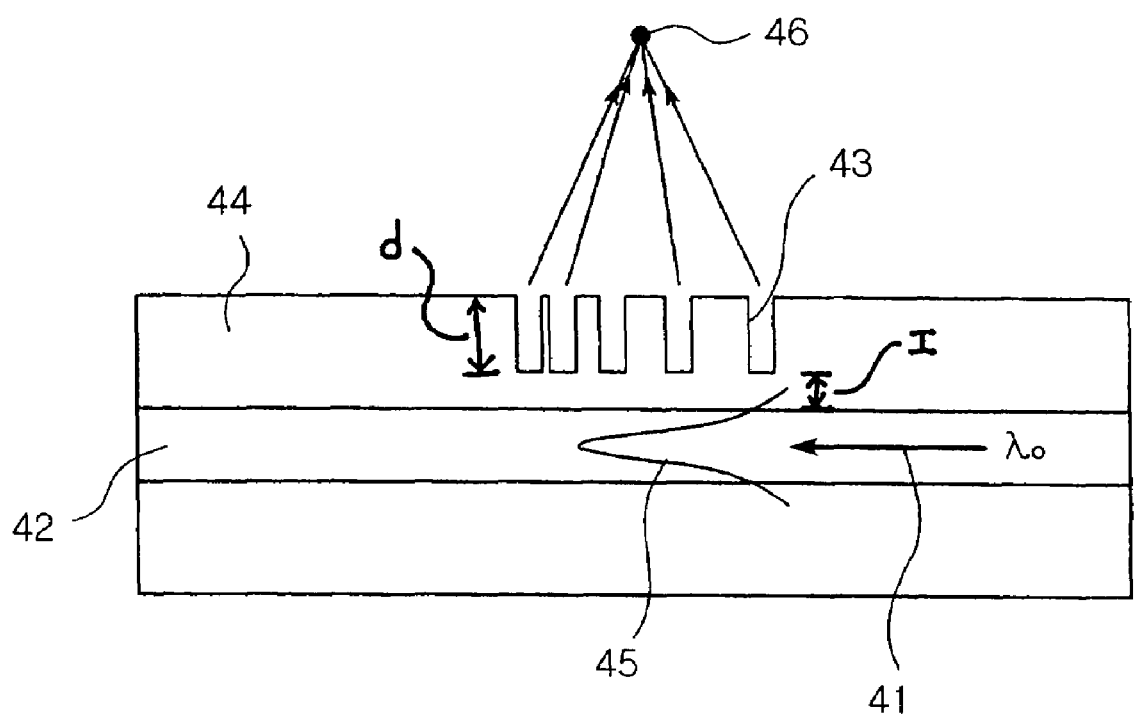
FIG. 4 is a sectional view of a wavelength selective optical focusing device having a fiber grating in which intervals between grooves are gradually decreased, in accordance with one embodiment of the present invention.

When the optical signal 41 having a wavelength of $\lambda_o$ guided by the core 42 of the wavelength selective optical focusing device 40 having the above structure meets a cladding-etched-chirp grating formed by etching the cladding layer 44 of the optical fiber, i.e., the fiber grating 43, the optical signal 41 is radiated to the outside of the optical fiber, and is concentrated onto a focus 46, as shown in FIGS. 3A and 3B. More specifically, the core mode 45 of the optical signal 41 guided by the core 42 is partially transmitted to the cladding layer 44 and meets the fiber grating 43 as shown in FIG. 3, the core mode 45 forms angles of scattering at the positions of the respective grooves so as to satisfy a momentum conservation law. Then, the core mode having the above angles of scattering is concentrated onto the focus 46. Since the optical fiber has a cylindrical shape in the crosswise direction and serves as a lens, it is necessary to properly adjust the length of the fiber grating 43 having a plurality of the grooves and the chirp rate of the intervals between the grooves and the widths of the grooves. For example, the length of the fiber grating 43 can be changed by applying an external impact, such as heat and voltage, to the optical fiber. Further, the position of the focus 46 can be adjusted thereby.

Figure 5:
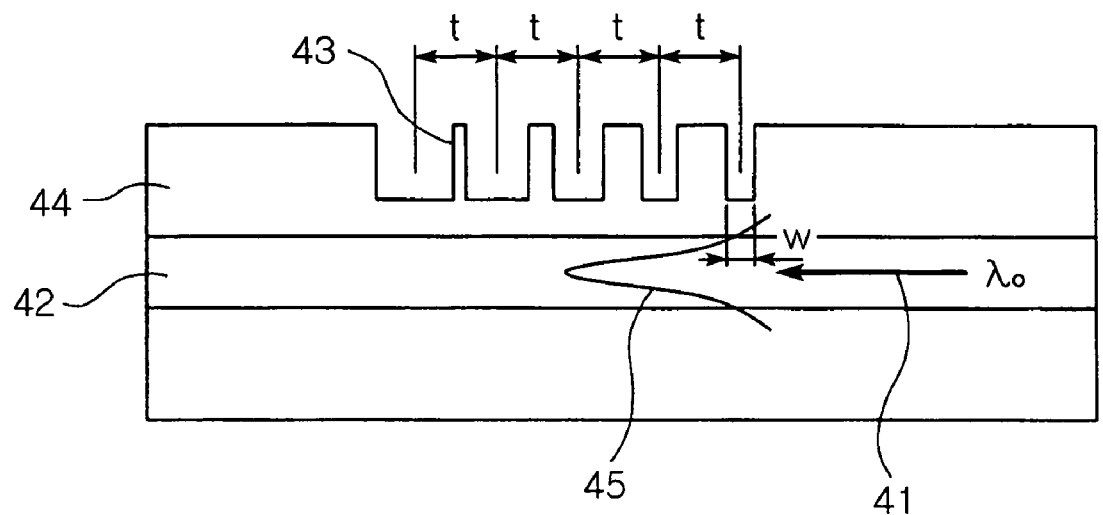
FIGS. 5A and 5B are sectional views of a wavelength selective optical focusing device having a fiber grating in which widths of grooves are changed, in accordance with another embodiment of the present invention.
Figure 5:
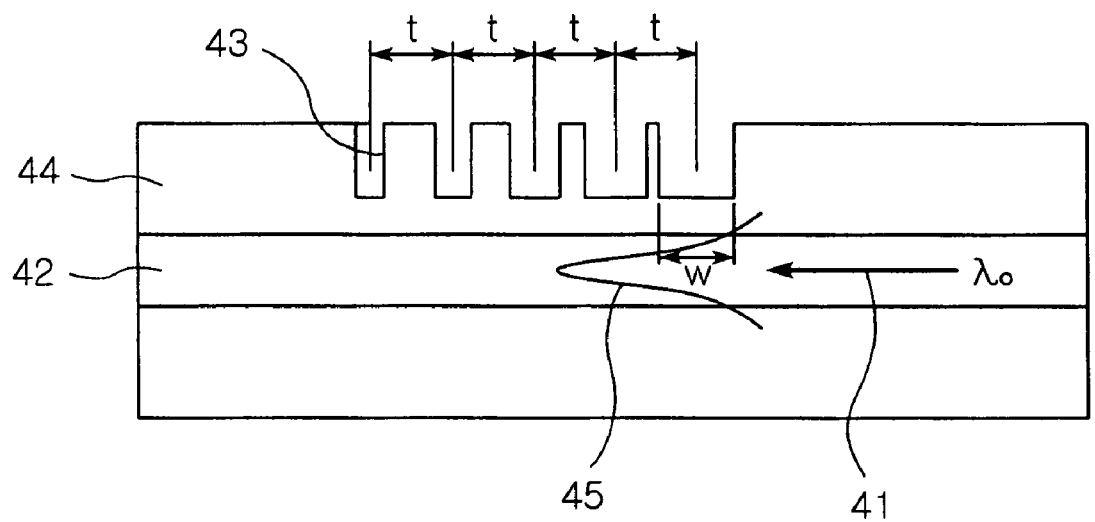

As shown in FIGS. 3A and 3B and FIG. 4, the fiber grating 43 of the wavelength selective optical focusing device 40 may have a structure in which the widths (w) of the grooves are the same and the intervals between the grooves are gradually increased or decreased. Further, as shown in FIGS. 5A and 5B, the fiber grating 43 of the wavelength selective optical focusing device 40 may have a structure in which the intervals (t) between the grooves are uniform and the widths (w) of the grooves are gradually increased or decreased in the traveling direction of the optical signal 41. In FIG. 5A, the intervals (t) between the grooves are uniform and the widths (w) of the grooves are gradually increased in the traveling direction of the optical signal 41. Further, in FIG. 5B, the intervals (t) between the grooves are uniform and the widths (w) of the grooves are gradually decreased in the traveling direction of the optical signal 41.

Figure 6:
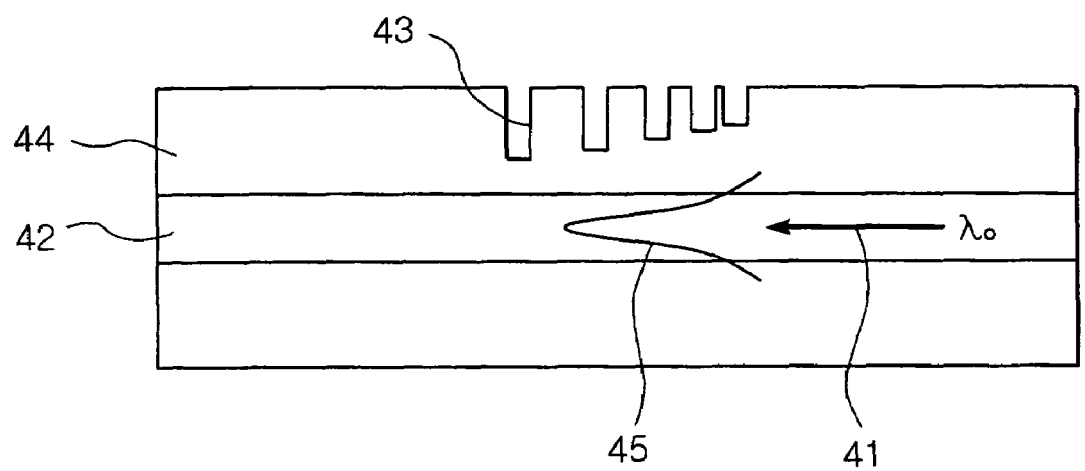
FIGS. 6A and 6B are sectional views of a wavelength selective optical focusing device having a fiber grating in which depths of grooves are changed, in accordance with yet another embodiment of the present invention.
Figure 6:
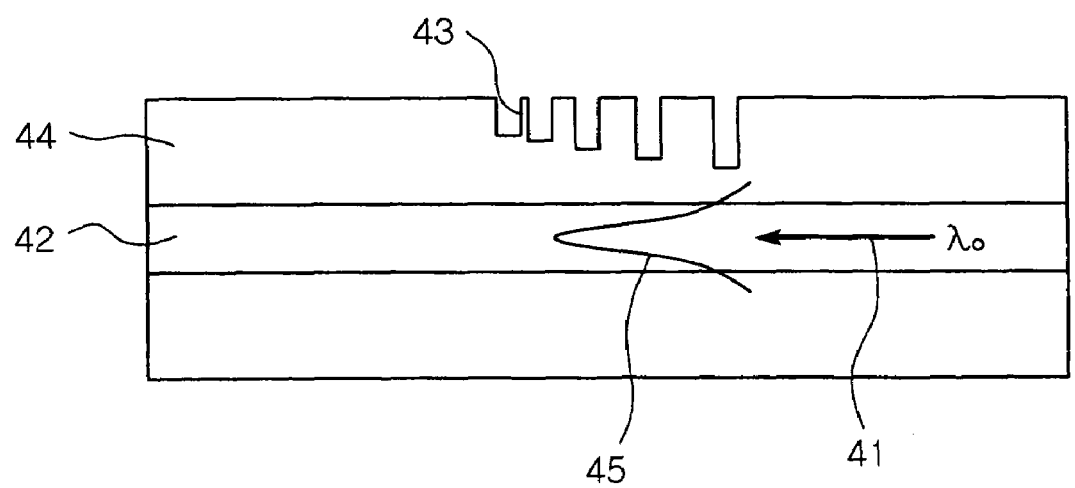

In FIGS. 3A and 3B, FIG. 4, and FIGS. 5A and 5B, the depths (d) of the grooves of the fiber grating 43 are the same. Further, as shown in FIGS. 6A and 6B, the fiber grating 43 of the wavelength selective optical focusing device 40 may have a structure in which the depths (d) of the grooves are gradually increased or decreased in the traveling direction of the optical signal 41. In FIG. 6A, the depths (d) of the grooves are gradually increased in the traveling direction of the optical signal 41. Further, in FIG. 6B, the depths (d) of the grooves are gradually decreased in the traveling direction of the optical signal 41.

The wavelength selective optical focusing device 40 of the present invention employs the cladding-etched-chirp grating 43 obtained by etching the cladding layer of the optical fiber, thereby radiating the optical signal 41 to the outside of the optical fiber through the effects of the cladding-etching, and concentrating the optical signal, radiated to the outside, onto the focus 46 by the function of the cladding-etched-chirp grating 43.

Accordingly, the wavelength selective optical focusing device 40 of the present invention enables optical coupling in a direction perpendicular to the longitudinal direction of the optical fiber, thereby facilitating the manufacturing of an optical element.

Figure 7:
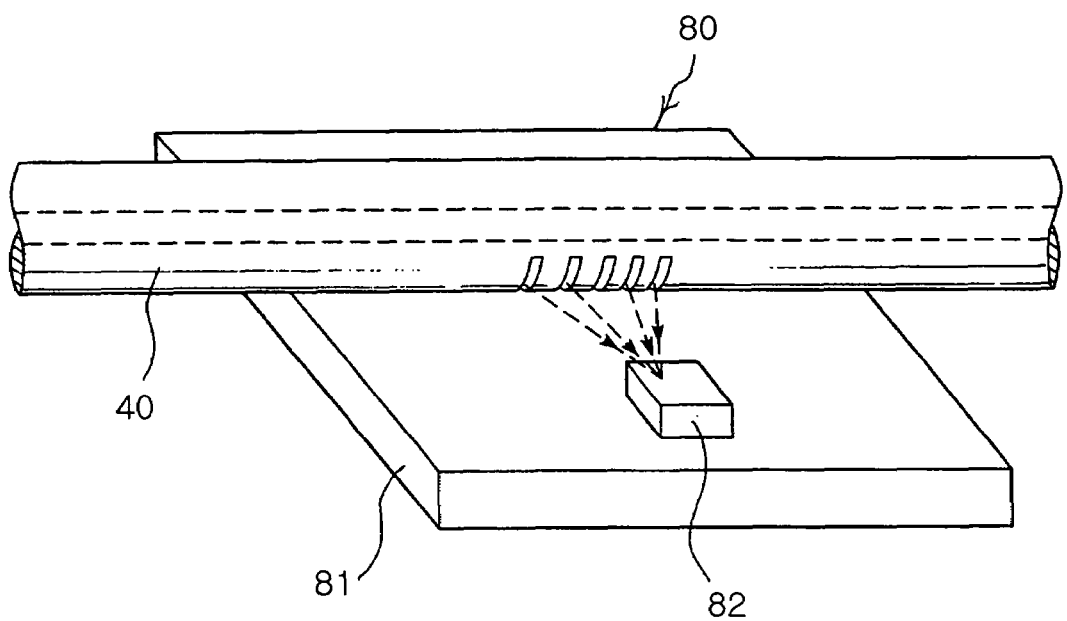
FIGS. 7A and 7B are perspective views respectively illustrating structures of optical modules using the wavelength selective optical focusing device of the present invention.
Figure 7:
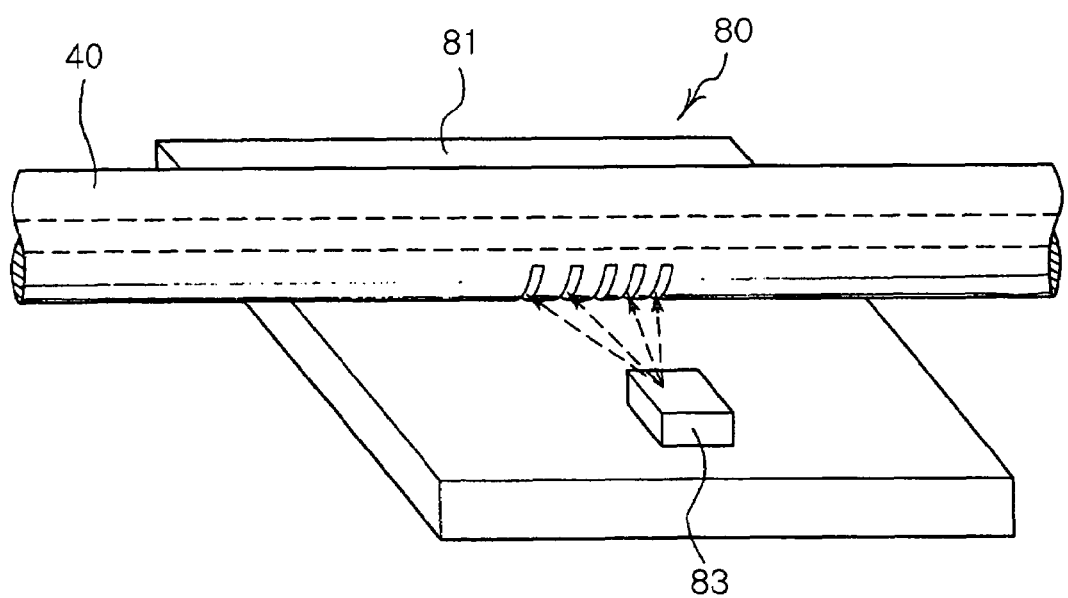

FIGS. 7A and 7B respectively illustrate structures of optical modules using the wavelength selective optical focusing device of the present invention.

With reference to FIGS. 7A and 7B, the optical module 80 of the present invention comprises a sub-mount 81, and a wavelength selective optical focusing device 40 having a grating obtained by etching a cladding layer of an optical fiber and mounted on the sub-mount 81. An optical element 82 or 83 for receiving or transmitting an optical signal is arranged on the sub-mount 81 at a position, onto which the optical signal is focused by the optical focusing device 40. Here, the sub-mount 81 may be a silicon optical bench (SiOB). For example, as shown in FIG. 7A, an optical receiver is formed by arranging an optical element 82 for sensing the optical signal, such as a photo diode, on the sub-mount 81 at the position, onto which the optical signal is focused by the optical focusing device 40, thereby sensing the intensity of the optical signal. Further, as shown in FIG. 7B, an optical transmitter is formed by arranging a light source 83, such as a laser diode, on the sub-mount 81 at the position, onto which the optical signal is focused by the optical focusing device 40, thereby vertically coupling with the optical fiber. The optical module 80 of the present invention may be used as an optical transceiver in a WDM-PON system. A BiDi or duplex optical transceiver, which has a structure in that a downstream has a wavelength of 1.55 μm and an upstream has a wavelength of 1.31 μm, is obtained by integrating a photo diode or a laser diode on the sub-mount 81, as described in the optical module 80 of the present invention, thus being simply packaged. The above optical module 80 meets the requirements of the component market, such as high-performance, high-integration, miniaturization and low-cost, thereby being widely applied.

As apparent from the above description, the present invention provides a wavelength selective optical focusing device, which exerts an optical focusing function as well as a wavelength selecting function to an optical fiber by partially etching a cladding layer of the optical fiber without using a separate device, such as a focus lens, and an optical module using the same. Accordingly, compared with a conventional planar waveguide, the wavelength selective optical focusing device of the present invention manufactures various optical modules including optical receivers, optical transmitters, optical sensors, and optical communication modules at low costs through a simple process.

Further, since a fine groove pattern is formed in the cladding layer of the optical fiber using photolithography, the wavelength selective optical focusing device of the present invention has excellent reproducibility in manufacturing and prevents aging generated as time passes, compared to a conventional method for forming a fiber grating using ultraviolet rays (UV).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wavelength selective optical focusing unit integrated in an optical fiber comprising a core elongated over a length for transmitting an optical signal therethrough and a cladding layer surrounding the outer surface of the elongated core, the wavelength selective optical focusing unit comprising:

a plurality of grooves formed in the outer circumferential surface of a portion of the cladding layer of the optical fiber such that each groove has a depth and an interval, the distance between two adjacent grooves, wherein the intervals are gradually increasing or decreasing, and wherein an optical signal having a designated wavelength guided by the core is focused through the cladding layer to the outside of the cladding layer by the grooves, and wherein the optical signal is focused perpendicular to the optical axis.

2. The wavelength selective optical focusing unit of claim 1, wherein widths of the grooves are gradually increased or decreased.

3. The wavelength selective optical focusing device as set forth in claim 2, wherein the widths of the grooves are varied according to the wavelength of the optical signal.

4. The wavelength selective optical focusing unit of claim 1, wherein depths of the grooves are uniform.

5. The wavelength selective optical focusing unit of claim 1, wherein depths of the grooves are gradually increased or decreased.

6. The wavelength selective optical focusing unit of claim 1, wherein the grooves are formed above the core.

7. The wavelength selective optical focusing unit of claim 1, wherein the grooves are filled with a polymer.

8. The wavelength selective optical focusing unit of claim 1, wherein the grooves are filled with an index matching material having the same reflective index as or a different refractive index from that of the cladding layer.

9. The wavelength selective optical focusing unit of claim 1, wherein the grooves are formed by partially etching the outer circumferential surface of the cladding layer to a designated depth by photolithography.

10. The wavelength selective optical focusing device as set forth in claim 1, wherein the plurality of the grooves are formed by partially etching the cladding layer by a dry or wet etching method using photolithography.

11. An optical module comprising:

a sub-mount;

an optical focusing device mounted on the sub-mount, comprising a core having a cross-sectional shape and elongated over a length for transmitting an optical signal therethrough and a cladding layer surrounding the outer surface of the elongated core and having a plurality of grooves formed in the outer circumferential surface of a portion of the cladding layer of an optical fiber such that each groove has a depth and an interval is the distance between two adjacent grooves, wherein the intervals are gradually increasing or decreasing, wherein an optical signal having a designated wavelength guided by the core is focused through the cladding layer to the outside of the cladding layer by the grooves, and wherein the optical signal is focused perpendicular to the optical axis; and an optical element arranged on the sub-mount at a position, onto which the optical signal is focused by the optical focusing device, for receiving or transmitting the optical signal.

12. The optical module as set forth in claim 11, wherein the optical element is a photo diode or a laser diode.

13. An optical fiber comprising:

a core having a cross-sectional shape and being elongated over a length for transmitting an optical signal therethrough; and a cladding layer surrounding the outer surface of the elongated core, wherein a plurality of grooves are formed to have openings on a portion of the outer circumferential surface such that each groove has a depth and an interval is the distance between two adjacent grooves, wherein the intervals are gradually increasing or decreasing, and wherein an optical signal having a designated wavelength guided by the core is focused through the cladding layer to the outside of the cladding layer by the grooves, and wherein the optical signal is focused perpendicular to the optical axis.

14. The optical fiber of claim 13, wherein widths of the grooves are gradually increased or decreased.

15. The optical fiber of claim 14, wherein the widths of the grooves are varied according to the wavelength of the optical signal.

16. The optical fiber of claim 13, wherein depths of the grooves are uniform.

17. The optical fiber of claim 13, wherein depths of the grooves are gradually increased or decreased.

18. The optical fiber of claim 13, wherein the grooves are formed above the core.

19. The optical fiber of claim 13, wherein the grooves are filled with a polymer.

20. The optical fiber of claim 13, wherein the grooves are filled with an index matching material having the same reflective index as or a different refractive index from that of the cladding layer.

* * * * *